United States Patent Office 3,023,178
Patented Feb. 27, 1962

3,023,178
EPOXIDE CONVERSION OF UNSATURATED ACIDS
Sylvan O. Greenlee and John W. Pearce, Racine, Wis., assignors to S. C. Johnson & Son, Inc., Racine, Wis.
No Drawing. Filed June 30, 1955, Ser. No. 519,273
3 Claims. (Cl. 260—22)

This invention relates to a new and improved method for preparing synthetic heat-converting compositions useful for the production of protective coatings and other more highly polymerized products. More particularly, this invention relates to compositions prepared from unsaturated acids and epoxide compositions, and to a method of converting these compositions into complex polymerized products under the influence of air oxidation and heat.

Presently, heat-converting compositions are widely used in the preparation of varnishes and other coating compositions. These are typically neutral esters of unsaturated acids and polyhydric alcohols modified with hard resinous materials such as Bakelite type resins and dissolved in an appropriate organic solvent. These coating compositions contain essentially high molecular weight esters having no cross-linking or a relatively small amount of cross-linkage, the conversion to a cross-linked highly polymerized product occurring when the mixture is exposed to air or heat and air so that conversion may take place through the olefin groups present in the unsaturated esters to form cross-linked complex products. Driers and catalysts may be added to the composition to accelerate the cross-linking of the ester polymers to a more complex product, and the drying composition may be prepared with or without the addition of a hard resin.

In the preparation of drying compositions such as described above, it has been the practice first to prepare esters of the unsaturated acids and polyhydric alcohols prior to the drying of the composition and the subsequent cross-linking through the unsaturated portions of the complex esters. This procedure has been followed since prolonged heating periods at high temperatures together with such other practices as the removal of water is usually necessary to bring about appreciable esterification of the polyhydric alcohols by the carboxylic groups present. In the manufacture of protective coating films, for instance, mixtures of polyhdric alcohols, unsaturated acids, and solvent have not been applied directly and then converted to a complex cross-linked product since the volatility of the acids and alcohols, and the prolonged heating period required at high temperatures, make such a procedure impracticable.

An object of this invention is to provide a novel method for the preparation of complex reaction products from unsaturated acids which may be conveniently carried out without initially esterifying the unsaturated acids prior to converting the acids to cross-linked products by polymerizing them through their unsaturated portions.

Another object of this invention is to provide a novel method of preparing complex reaction products from unsaturated acids wherein the carboxyl groups of the acids are esterified with epoxide groups simultaneously with the polymerization of the acids through their unsaturated portions.

The foregoing and other objects and advantages are attained by the present invention, various novel features of which will become more fully apparent from the following description, with particular reference to specific examples which are to be considered as illustrative only.

According to the present invention, it has been found that mixtures of polyepoxides and unsaturated acids may be satisfactorily reacted with each other so that esterification and polymerization through the unsaturated portions take place simultaneously to yield valuable reaction products in a typical heat-curing schedule at temperatures of from 100–200° C. The present invention is applicable to those unsaturated acids which may be used in heat-converting compositions and which may be polymerized through their unsaturated portions to form complex products. These unsaturated acid materials may contain from 6 to 40 or more carbon atoms and include the drying oil acids illustrated by such animal, vegetable and fish oil acids as oleic acid, linseed oil acids, China-wood oil acids and clupanodonic acid. Other acids which may be used are the 11-carbon undecenoic acid, an unsaturated acid which is a decomposition product from castor oil acids, and the 6-carbon sorbic acid containing 2 double bonds per molecule.

Still another type of unsaturated acid which may be used in the present invention are the diester acids prepared by the esterification of hydroxyaryl-substituted aliphatic acids, referred to for convenience as diphenolic acids, with unsaturated aliphatic acids having at least about 10 carbon atoms. These diester acids are prepared carrying out the esterification under conditions which permit esterification of the phenolic hydroxyl groups of the diphenolic acid without disturbing the carboxyl group of the diphenolic acid. The preparation of compositions such as these is more fully described in a copending Greenlee application of even date entitled "Unsaturated Diester Acids," Serial No. 519,274, now U.S. Patent No. 2,907,779.

When compositions are prepared using polyepoxides and unsaturated acids in such proportions that the epoxide groups in the composition are at least substantially equivalent to the acid groups present, it is possible to prepare complex reaction products allowing the polymerization through the unsaturated portions to proceed simultaneously with the esterification of the acid groups by the epoxide groups present. By using proportions such that the epoxide groups are at least substantially equivalent to the acid groups, the esterification in the reaction mixture for the most part involves direct splitting of the epoxide groups by addition, so that one unreacted hydroxyl group is present for each ester linkage formed. The reaction may be illustrated as follows:

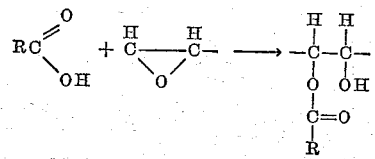

While hydroxyl groups are formed, or may be present in the polyepoxide used, these groups never take part to any great extent in the esterification reaction, since the esterification of an acid with an hydroxyl group is considerably slower than the esterification of an acid with an epoxide group.

The polyepoxides used in this invention preferably should have an average of at least about 2½ epoxide groups per molecule. The number of epoxide groups per molecule may be considerably higher and valuable compositions may be obtained using compositions having up to 12 or more epoxide groups per molecule.

The polyepoxides which have been found to be valuable include such polyepoxides as those that may be prepared by epoxidizing the polyesters of tetrahydrophthalic acid and glycols. These epoxide compositions generally contain 3 or more epoxide groups per molecule and may be prepared having up to as many as 15 epoxide groups per molecule. The preparation of these epoxidized esters of tetrahydrophthalic acid and glycols is more fully described in a copending application filed April 22, 1955, having Serial Number 503,323.

Other polyepoxide compositions which may be used are the epoxide compositions derived from the epoxidation of vegetable and fish oils. These vegetable and fish oils are essentially glycerides based on unsaturated long-chain aliphatic acids, and they may be epoxidized by methods which are known to form polyepoxides useful in this invention. Epoxidized esters of aliphatic animal and vegetable oil acids with polyhydric alcohols, such as pentaerythrtol, sorbitol, and polyallyl alcohol may also be used.

Still other polyepoxide compositions which may be used in this invention are the epoxidized alkyd resins, these alkyd resins being mixed esters of polybasic acids and unsaturated animal and vegetable oil acids. The triepoxides prepared by the reaction of trihydric phenols in the presence of alkali, with 3 mols of epichlorohydrin may also be used, as well as the epoxides formed by reacting polyhydric phenols of the phenol formaldehyde condensate type with epichlorohydrins and dichlorohydrins. These complex epoxide resins are described more fully in U.S. Patents 2,456,408, 2,503,726, 2,615,007, 2,615,008, 2,668,805, and 2,698,315. Simple aliphatic polyepoxides such as the olefin polymerization products of allyl glycidyl ether may also be used advantageously in this invention.

The esterification of the unsaturated aliphatic acids with a polyepoxide, where the mixtures are prepared so that there is substantially one or more epoxide groups present in the mixture for each carboxyl group, may be carried out in a normal type of film curing process at temperatures of from approximately 100 to 225° C. over relatively short periods of time. In the preparation of a composition for use as a protective coating, a mixture of unsaturated acids and polyepoxides together with any drier which may be used would be dissolved in an organic solvent so as to give the desired viscosity for use. This composition may then be applied in the form of a film and cured using a conventional curing process at moderate temperatures. In the formulation of an adhesive composition, solvents may or may not be used depending upon such characteristics as the viscosity desired in the reaction mixture. Driers which are used my be illustrated by metallic ion type driers such as cobalt naphthenate, the metallic ion tending to catalyze the polymerization through the unsaturated portions of the acids to form cross-linked complex products.

The process described herein has many advantages including the economic advantage that the rather expensive esterification prior to heat converting may be eliminated. The compositions of this invention may, therefore, be used in preference to more costly compositions prepared by methods heretofore used. And since esterification and polymerization through the olefin groups occurs simultaneously, an opportunity exists to use highly sensitive materials such as Chinawood oil acids which heretofore could not be used readily due to their tendency to polymerize through their olefin groups before appreciable esterification could take place. In addition, particularly in those instances where a coating composition is being prepared, since the reaction mixtures of this invention may be applied without pre-esterification, the present invention permits the viscosities of the reaction mixtures to be readily adjusted prior to curing the reaction mixture to form complex cross-linked reaction products.

The following examples will serve to illustrate this invention, however, it should be understood that the invention is not intended to be limited thereby. Proportions expressed are parts by weight unless otherwise indicated.

Acid value as used herein represents the number of milligrams of KOH equivalent to the acidity present in a one-gram sample. Saponification value as used herein is defined as the number of milligrams of KOH which are required to saponify the ester present in a one-gram sample. The hydroxyl value as used herein is the number of milligrams of KOH equivalent to the hydroxyl content in a one-gram sample.

Example I illustrates the preparation of a long-chain unsaturated acid chloride used in the esterification of diphenolic acids to obtain unsaturated diester acids.

*Example I*

The reaction was carried out in a 2-liter, 3-neck flask provided with a dropping funnel, reflux condenser, and a thermometer. With continuous agitation, 286 parts of thionyl chloride was added over a period of 2 hours to a mixture of 560 parts of soya fatty acids and 200 parts of benzene. The temperature was held during the addition in the range of 60–65° C., and maintained for an additional 2½ hours. Benzene and excess thionyl chloride was then removed under reduced pressure. After removal of the benzene and unreacted thionyl chloride, the product was finally purified by vacuum distillation at 3 mm. pressure.

Example II illustrates the preparation of an unsaturated diester acid such as may be used in this invention.

*Example II*

The preparation was carried out in a 3-neck flask provided with a mechanical agitator, a thermometer, and a condenser attached to an exhaust system. A mixture of 71.5 parts of 4,4-bis(4-hydroxyphenyl)-pentanoic acid and 136 parts of the acid chloride from Example I was heated with agitation at 70–85° C. for a period of 3 hours, after which the temperature was gradually increased to 136° C. over a period of 2 hours, and maintained at this temperature for an additional 2 hours. During the latter 4 hours of the reaction period this system was vacuated to a pressure of around 30–40 mm., using a water aspirator to facilitate removal of HCl formed in the reaction. The viscous liquid product had an acid value of 89, an hydroxyl value of 21, and a saponfication value of 225.

Examples III and IV illustrate the preparation of polyepoxide polyesters such as may be used in this invention.

*Example III*

In a 3-neck flask provided with a thermometer, a mechanical agitator, and reflux condenser attached through a water trap was placed a mixture of 1.1 mol tetrahydrophthalic anhydride and 0.2 mol n-butanol. After melting the tetrahydrophthalic anyhdride in the presence of the butanol, 1 mol of 1,4-butanediol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to 8.6, a period of about 24 hours. The polyester product was a highly viscous, tacky solid having slight flow at room temperature.

In a 3-neck flask provided with a thermometer, a mechanical agitator, and a reflux condenser was placed 107 parts of a dehydrated acid form of a cation exchange resin and 30 parts glacial acetic acid. This dehydrated form of resin was prepared by washing an alkali salt form of a salt-splitting styrenedivinylbenzene copolymer type resin (Dowex 50X–8, 50–100 mesh, Dow Chemical Company) several times with 4 to 6 normal hydrochloric acid, followed by washing the neutralized resin several times with water and drying the product in a vacuum oven at 80° C. for about 16 hours.

The mixture of cation exchange resin and acetic acid was allowed to stand until the resin had completely taken up the acid. To this mixture was added 273 parts nonvolatile of the polyester dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. In some preparations involving other polyester resins, sufficient exothermic heat is produced during the addition of hydrogen peroxide so that no external heat is required, or even some external cooling may be required. The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 56.9. The percent nonvolatile of this solution, amounting to 559 parts, was 50.

The 559 parts of solution was thoroughly mixed with 175 parts of a dehydrated basic form of an amine type anion exchange resin. The anion exchange resin was prepared by treating an acid salt form of the resin (Dowex I, Dow Chemical Company) with 4 to 6 N alkali, followed by washing the neutralized product, and drying the product overnight in a vacuum oven at 80° C. The resulting mixture was then filtered followed by pressing as much of the solution as possible from the anion exchange resin cake. This product had an acid value of 10.1 on the nonvolatile resin content and an epoxide equivalent (equivalent weight to epoxide group) of 304 on the nonvolatile resin content. The nonvolatile content was 45%.

The epoxide values as discussed herein were determined by refluxing for 30 minutes a 2-gram sample with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

*Example IV*

An alkyd resin was prepared by placing in a flask provided with a thermometer, a mechanical agitator and a condenser attached through a water trap 434 parts of glycerine and 1270 parts of oleic acid. The temperature was then gradually raised with agitation to 220° C. over a period of 2 hours. Reaction was continued for a period of 1½ hours at this temperature until the acid value of the mixture of glycerine and oleic acid had reached 10. At this point, 617 parts of phthalic anhydride was added and the temperature was gradually increased to 250° C. and held at this temperature for 2 hours and 30 minutes, until the acid value had again decreased below 10. The alkyd resin product had an acid value of 6.3 and an iodine value of 69 on the nonvolatile content. The viscosity of the nonvolatile content in a 40% xylene solution was A-1 (Gardner-Holdt viscosimeter method). 367 parts (nonvolatile) of this alkyd resin was epoxidized with 75 parts of 50% hydrogen peroxide in accordance with the epoxidation procedure of Example III to give 362 parts (nonvolatile) of an epoxide product having an epoxide equivalent weight of 552 on the nonvolatile content.

The following examples illustrate the conversion of unsaturated aliphatic acids and polyepoxides to complex products such as may be used in coating compositions. In the conversion of these mixtures, the proportions of the reactants were adjusted so that the esterification of the carboxyl groups present would be primarily by epoxide groups. As shown by the examples, when the reaction mixtures are prepared in this manner, esterification and polymerization through the olefin groups can be carried out simultaneously under moderate heat-curing conditions so that converted products may be obtained without the necessity of prior esterification of the carboxyl groups in the unsaturated aliphatic acids. In general, the films discussed in the examples were of approximately .002" thickness.

*Example V*

To a mixture of 20 parts of a 45% solution of the diester acid of Example II in xylene and 10 parts of the nonvolatile polyepoxide product of Example III was added cobalt naphthenate paint drier in an amount equal to .02% of the nonvolatile content of the diester acid. Thin films of this varnish flowed on to tin panels and heat-treated in an oven for 1 hour at 175° C. converted to tack-free films which were unaffected by exposure to boiling water for 9 hours, or by exposure to 5% aqueous NaOH for 3 hours. Hard, tough, flexible films were also obtained by using a curing schedule of 10 minutes at 200° C.

*Example VI*

Linseed oil acids were converted to acid chlorides as in Example I except that the vacuum distillation was omitted. A diester acid was prepared as in Example II using linseed oil acid chlorides and 4,4-bis(4-hydroxyphenyl)-pentanoic acid, the diester acid having an acid value of 84, a saponification value of 222, and a hydroxyl value of 8.

A composition prepared as in Example V using the linseed oil acid diester together with the product of Example III and cobalt naphthenate drier gave films which on heat treatment for a period of 1 hour at 175° C. were unaffected by exposure to boiling water for 9 hours, or by exposure to 5% aqueous NaOH for 1¼ hours. Tack-free films were also obtained on curing this composition for 15 minutes at 200° C.

*Example VII*

Dehydrated castor oil acids were converted to acid chlorides as in Example I, the product being purified by vacuum distillation at 3 mm. pressure. A diester acid was prepared as in Example II using these acid chlorides and 4,4-bis(4-hydroxyphenyl)-pentanoic acid, the diester acid having an acid value of 86, a saponification value of 218, and a hydroxyl value of 12.

A composition prepared as in Example V using the castor oil acid diester together with the product of Example III and cobalt naphthenate drier gave films which on heat treatment for 1 hour at 175° C. were unaffected by exposure to boiling water for 9 hours or exposure to 5% aqueous NaOH for 3 hours. Tack-free film conversion was also obtained on heat treatment for 15 minutes at 200° C.

*Example VIII*

To a mixture of 675 parts of a 45% solution of the polyepoxide resin of Example III in xylene and 112 parts of sorbic acid was added cobalt naphthenate drier in an amount equal to .05% of the nonvolatile content of the polyepoxide, and zirconium drier in an amount equal to .15% of the nonvolatile content of the polyepoxide. This varnish solution, when spread in .002" wet films and heat treated for 30 minutes at 175° C., gave had, flexible, tack-free films. These films withstood boiling water for a period of 21 hours.

*Example IX*

A mixture of 282 parts of oleic acid and 675 parts of the polyepoxide of Example III was treated with cobalt naphthenate drier in an amount equal to .01% of the nonvolatile content of the polyepoxide and zirconium naphthenate drier in an amount equal to .03% of the nonvolatile content of the polyepoxide. This parnish solution, when spread in .002" wet films and heat treated for 30 minutes at 175° C., gave tack-free, flexible films. These films withstood boiling water for a period of 20 hours.

*Example X*

To a mixture of 1640 parts of the epoxidized alkyd resin of Example IV, adjusted to a nonvolatile content in xylene of 34%, and 292 parts of dehydrated castor oil acids, was added cobalt naphthenate drier in an amount equal to .005% of the nonvolatile content of the polyepoxide naphthenate drier in an amount equal to .015% of the nonvolatile content of the polyepoxide. This varnish solution was spread in .002″ wet films and heat treated for 30 minutes at 175° C. to yield tack-free flexible films.

Example XI

A mixture of 262 parts of Admex 710 (epoxidized soyabean oil marketed by Archer-Daniels-Midland Company, having an epoxide equivalent of 262) and 290 parts of linseed oil acids was treated with cobalt naphthenate drier in an amount equal to .01% of the nonvolatile content of the polyepoxide and zirconium naphthenate drier, in an amount equal to .03% of the nonvolatile content, and finally dissolved in xylene to a nonvolatile content of 60%. This varnish solution when spread in .002″ wet films and heat treated for 30 minutes at 175° C. gave a tack-free product. This product, while completely converted to a tack-free, flexible film, is more of an oil type film in its characteristics, not having the normal hardness experienced in varnish products. In actual practice, this particular formulation would be used as the oil portion of a coating formulation, and mixed with a hard resin ingredient such as phenol-formaldehyde resin.

It will be seen from the examples that the initial compositions of acid materials and polyepoxides may be mixed directly and heat cured to form more highly polymerized cross-linked products without the necessity of carrying out a separate esterification of the acid groups present.

The new compositions are capable of being mixed with various other resinous materials, fillers, pigments, etc. as desired to give modified converted products which are flexible and infusible. Also, since the reaction mixtures used in this invention need not contain highly esterfied unsaturated acids prior to final conversion, the viscosities of the reaction mixtures may be adjusted readily within a large range.

While various embodiments of this invention have been described, it should be understood that it is not intended to restrict the invention thereto, and that it is desired to cover all modifications of the invention which would be apparent to one skilled in the art and that come within the scope of the appended claims.

It is claimed and desired to secure by Letters Patent:

1. The process of forming an insoluble, infusible, flexible tack free protective film on a base which comprises applying to a base a miscible mixture comprising an aliphatic ethylenically unsaturated monocarboxylic acid containing at least six carbon atoms in a carbon to carbon unsaturated aliphatic chain and a polyepoxide having an average of more than about 2½ oxirane groups per molecule in a ratio whereby the number of oxirane groups in said mixture are at least as great as the number of carboxyl groups provided by said acid in said mixture, said polyepoxide being selected from the group consisting of epoxidized polyesters of tetrahydrophthalic acid and saturated aliphatic glycols, and epoxidized esters of ethylenically unsaturated vegetable oil acids, the oxirane groups of said ester being in the acid moiety, said monocarboxylic acid and polyepoxide being miscible at both room and esterification temperatures; and heating said film on said base to a temperature from about 100° C. to about 225° C. whereby said acid is simultaneously eserified with said polyepoxide and polymerized through its unsaturated aliphatic chain to form said film on said base, said film consisting essentially of the reaction product of said aliphatic ethylenically unsaturated monocarboxylic acid and said polyepoxide.

2. The process according to claim 1 wherein the monocarboxylic acid is an ethylenically unsaturated natural oil acid and the polyepoxide is an epoxidized polyester of tetrahydrophthalic acid and an aliphatic glycol.

3. The process of claim 1 wherein the polyepoxide is an epoxidized alkyd resin of glycerin, oleic acid and phthalic anhydride.

References Cited in the file of this patent

UNITED STATES PATENTS

| | | |
|---|---|---|
| 2,500,765 | Montague | Mar. 14, 1950 |
| 2,542,664 | Greenlee | Feb. 20, 1951 |
| 2,575,440 | Bradley | Nov. 20, 1951 |
| 2,653,141 | Greenlee | Sept. 22, 1953 |
| 2,658,884 | D'Alelio | Nov. 10, 1953 |
| 2,658,885 | D'Alelio | Nov. 10, 1953 |
| 2,695,894 | D'Alelio | Nov. 30, 1954 |
| 2,759,901 | Greenlee | Aug. 21, 1956 |
| 2,768,153 | Shokal | Oct. 23, 1956 |
| 2,852,477 | Greenlee | Sept. 16, 1958 |
| 2,907,735 | Greenlee | Oct. 6, 1959 |

OTHER REFERENCES

Turner et al.: Paint Manufacture, September 1956, pp. 321–326.

"Epon Resins," Technical Publication SC:52–31, Shell Chem. Corp., 1952, pages 7, 17–19.

UNITED STATES PATENT OFFICE
CERTIFICATE OF CORRECTION

Patent No. 3,023,178                                February 27, 1962

Sylvan O. Greenlee et al.

It is hereby certified that error appears in the above numbered patent requiring correction and that the said Letters Patent should read as corrected below.

Column 6, line 54, for "had" read -- hard --; line 63, for "parnish" read -- varnish --; column 8, line 15, for "eserified" read -- esterified --.

Signed and sealed this 23rd day of October 1962.

(SEAL)
Attest:

ERNEST W. SWIDER                                   DAVID L. LADD
Attesting Officer                                     Commissioner of Patents